United States Patent
Hagihara

(10) Patent No.: US 7,999,871 B2
(45) Date of Patent: Aug. 16, 2011

(54) SOLID-STATE IMAGING APPARATUS, AND VIDEO CAMERA AND DIGITAL STILL CAMERA USING THE SAME

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 564 days.

(21) Appl. No.: 12/115,055

(22) Filed: May 5, 2008

(65) Prior Publication Data

US 2008/0278605 A1 Nov. 13, 2008

(30) Foreign Application Priority Data

May 8, 2007 (JP) ................................ 2007-123118

(51) Int. Cl.
*H04N 3/14* (2006.01)
(52) U.S. Cl. ........................................ 348/308; 348/294
(58) Field of Classification Search .................. 348/272, 348/281, 282, 283, 294, 297, 298, 299, 300, 348/301, 302, 303, 304, 306, 307, 308, 309, 348/310, 311, 312, 313, 314, 315, 316, 317, 348/318, 319, 320, 321, 322, 323, 324
See application file for complete search history.

(56) References Cited

U.S. PATENT DOCUMENTS

| | | | | |
|---|---|---|---|---|
| 6,963,362 B1 * | 11/2005 | Nakayama | ............... | 348/224.1 |
| 7,561,197 B2 * | 7/2009 | Brissot | ............... | 348/308 |
| 2002/0097331 A1 * | 7/2002 | Yamada et al. | ............... | 348/321 |
| 2004/0031905 A1 * | 2/2004 | Chan et al. | ............... | 250/208.1 |
| 2007/0024726 A1 * | 2/2007 | Nomoto et al. | ............... | 348/308 |

FOREIGN PATENT DOCUMENTS

JP 2005-065184 A 3/2005

* cited by examiner

*Primary Examiner* — David L Ometz
*Assistant Examiner* — Peter Chon
(74) *Attorney, Agent, or Firm* — Westerman, Hattori, Daniels & Adrian, LLP

(57) ABSTRACT

A solid-state imaging apparatus including: an image section having a plurality of pixel units arranged into a matrix, each pixel unit having at least one subunit consisting of an electric charge generation means for generating signal electric charges corresponding to the amount of incident electromagnetic wave and a signal transfer means for transferring signal electric charges generated by the electric charge generation means, an electric charge accumulation means for accumulating the transferred signal electric charges, a first reset means for resetting the electric charge accumulation means, an amplification means for amplifying a signal corresponding to signal electric charges accumulated at the electric charge accumulation means, and a select means for selectively outputting the amplified signal to a vertical signal line; and a signal transfer assisting means for making a gradient of potential in the vicinity of the electric charge generation means toward the signal transfer means to be greater at the time of transfer of the signal electric charge than at the time of non-transfer.

7 Claims, 15 Drawing Sheets

SOLID-STATE IMAGING APPARATUS, AND VIDEO CAMERA AND DIGITAL STILL CAMERA USING THE SAME

This application claims benefit of Japanese Patent Application No. 2007-123118 filed in Japan on May 8, 2007, the contents of which are incorporated by this reference.

BACKGROUND OF THE INVENTION

The present invention relates to solid-state imaging apparatus which are widely used for example as image input apparatus, and also relates to video camera and digital still camera using such solid-state imaging apparatus.

Various types such as MOS type and CCD type have been proposed and practically used as solid-state imaging apparatus. Among the MOS type is the so-called amplified solid-state imaging apparatus having pixels of amplified solid-state imaging device (APS: Active Pixel Sensor) construction where a drive transistor for amplification is provided at a pixel signal generation means which generates pixel signal corresponding to signal electric charge generated at an electric charge generation means. For example, many of (C)MOS solid-state imaging apparatus have such construction. The pixel signals are read to the outside of such amplified solid-state imaging apparatus by controlling address on a pixel section having an arrangement of a plurality of unit pixels so that signals from each unit pixel are optionally selected.

Further for example as disclosed in Japanese Patent Application Laid-Open 2005-65184, as the electric charge generation means (such as photodiode PD section) of pixel of those (C)MOS solid-state imaging apparatus that are currently used for example in video camera and digital still camera, it is a general practice to use a complete transfer type buried photodiode so that signal electric charge generated at the PD section can be completely transferred to an electric charge accumulation section (floating diffusion FD section) to reduce noise.

SUMMARY OF THE INVENTION

In accordance with a first aspect of the invention, there is provided a solid-state imaging apparatus including: an image section having a plurality of pixel units arranged into a matrix, each pixel unit having at least one subunit consisting of an electric charge generation means for generating signal electric charges corresponding to the amount of incident electromagnetic wave and a signal transfer means for transferring signal electric charges generated by the electric charge generation means, an electric charge accumulation means for accumulating the transferred signal electric charges, a first reset means for resetting the electric charge accumulation means, an amplification means for amplifying a signal corresponding to signal electric charges accumulated at the electric charge accumulation means, and a select means for selectively outputting the amplified signal to a vertical signal line; and a signal transfer assisting means for making a gradient of potential in the vicinity of the electric charge generation means toward the signal transfer means to be greater at the time of transfer of the signal electric charge than at the time of non-transfer.

In a second aspect of the invention, the signal transfer means in the solid-state imaging apparatus according to the first aspect contains a first MOS transistor, and the signal transfer assisting means contains a second MOS transistor.

In a third aspect of the invention, the first MOS transistor in the solid-state imaging apparatus according to the second aspect is activated at its control electrode at the time of transfer of the signal electric charge, and a potential of an opposite polarity from an activating potential is applied to the second MOS transistor at its control electrode.

In a fourth aspect of the invention, the second MOS transistor in the solid-state imaging apparatus according to the second or third aspect is used as a second reset means for resetting the electric charge generation means.

In a fifth aspect of the invention, the second MOS transistor in the solid-state imaging apparatus according to the fourth aspect is activated at its control electrode at the time of a reset of signal electric charges of the electric charge generation means, and a potential of an opposite polarity from an activating polarity is applied to the first MOS transistor at its control electrode.

In a sixth aspect of the invention, there is provided a video camera including: a solid-state imaging apparatus according to any one of the first to fifth aspects; a lens for forming an object image on the solid-state imaging apparatus; and a signal processing means for effecting a predetermined signal processing on video signals from the solid-state imaging apparatus to generate luminance signal and chroma signal.

In a seventh aspect of the invention, there is provided a digital still camera including: a solid-state imaging apparatus according to any one of the first to fifth aspects; a lens for forming an object image on the solid-state imaging apparatus; and a signal processing means for processing signals from the solid-state imaging apparatus.

DESCRIPTION OF THE PREFERRED EMBODIMENTS

Some embodiments of the solid-state imaging apparatus according to the invention and video camera and digital still camera using the same will be described below with reference to the drawings.

Embodiment 1

Figure 1:
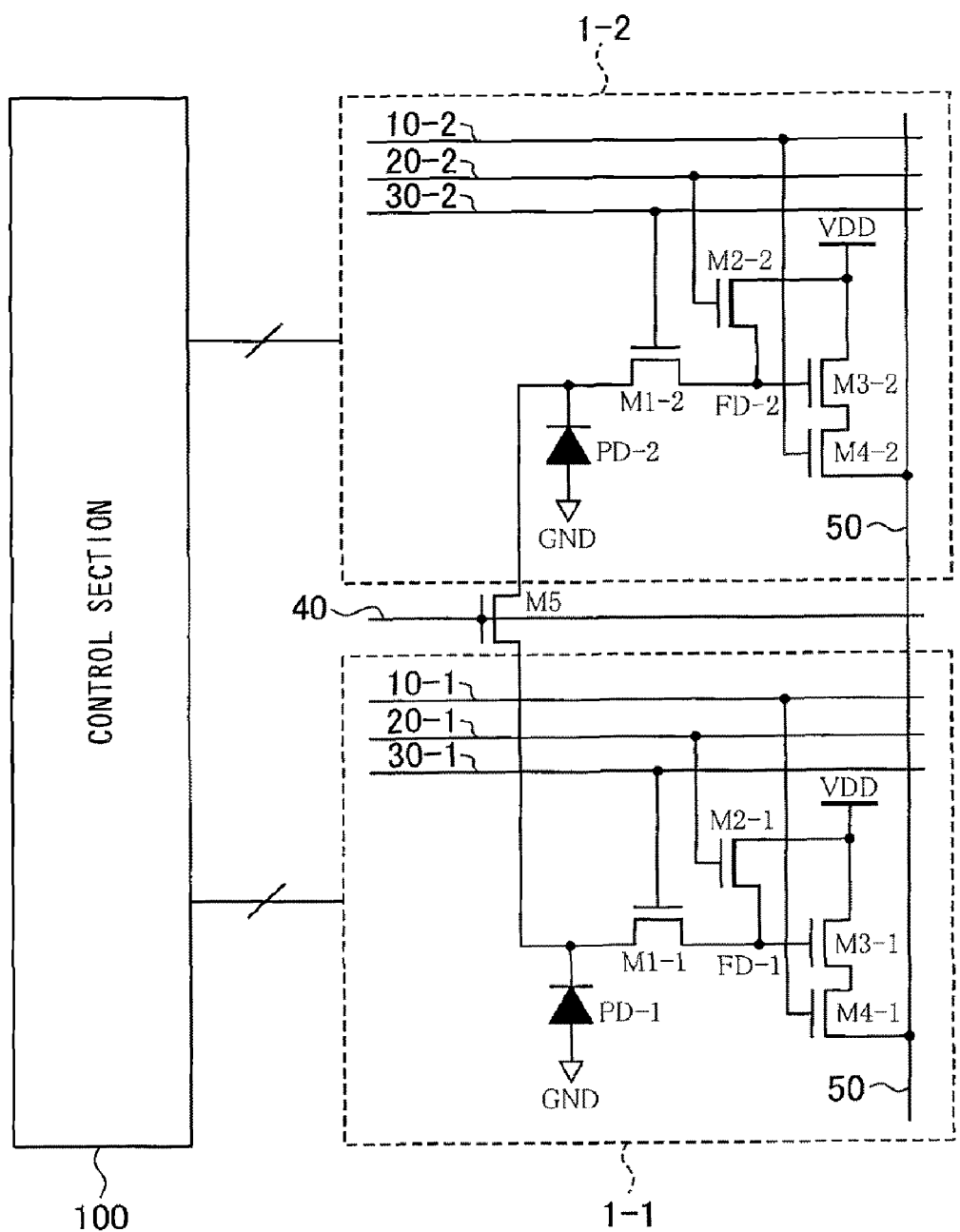
FIG. 1 shows an equivalent circuit construction of pixel of a pixel section and its control section in a first embodiment of the solid-state imaging apparatus according to the invention.

A first embodiment of the solid-state imaging apparatus according to the invention will now be described. The first embodiment corresponds to an embodiment according to the first to third aspects of the invention. FIG. 1 shows an equivalent circuit of pixel of a pixel section and its control section in the solid-state imaging apparatus according to the first embodiment. While for convenience of explanation, only two pixels, i.e. a first pixel 1-1 and a second pixel 1-2 are shown as the pixels in FIG. 1, the pixel section is constructed such that pixels of the same construction as the first or second pixel are arranged into a two-dimensional matrix. As shown in FIG. 1, the first pixel 1-1 and second pixel 1-2 respectively include: a photodiode PD-1, PD-2 for generating signal electric charges corresponding to the amount of incident electromagnetic wave; an electric charge accumulation section FD-1, FD-2 for accumulating electric charges generated at the photodiode PD-1, PD-2; a transfer MOS transistor M1-1, M1-2 which is a transfer switch for transferring the generated electric charges to the charge accumulation section FD-1, FD-2; a reset transistor M2-1, M2-2 which is a reset switch for resetting the charge accumulation section FD-1, FD-2; an amplification transistor M3-1, M3-2 for amplifying signal that corresponds to the electric charges of the charge accumulation section FD1, FD2; a select transistor M4-1, M4-2 which is a select switch for selecting the amplified signal; a select switch line 10-1, 10-2; FD reset switch line 20-1, 20-2; transfer switch line 30-1, 30-2; and a vertical signal line 50. The reset transistor M2-1, M2-2 is assumed to be a depletion type MOS transistor (or an equivalent transistor).

A signal transfer assisting MOS transistor M5 is connected between photodiode PD-1 of the first pixel 1-1 and photodiode PD-2 of the second pixel 1-2, and the gate of the MOS transistor M5 is connected to a signal transfer assisting switch line 40. It should be noted that the select switch line 10-1, 10-2, FD reset switch line 20-1, 20-2, transfer switch line 30-1, 30-2, and signal transfer assisting switch line 40 are respectively connected in common to those pixels that are arranged in a row direction, and the vertical signal line 50 is connected in common to those pixels that are arranged in a column direction. Each section is driven and controlled by control signal from a control section 100. All of the above MOS transistors are n-channel MOS transistor.

Figure 2:
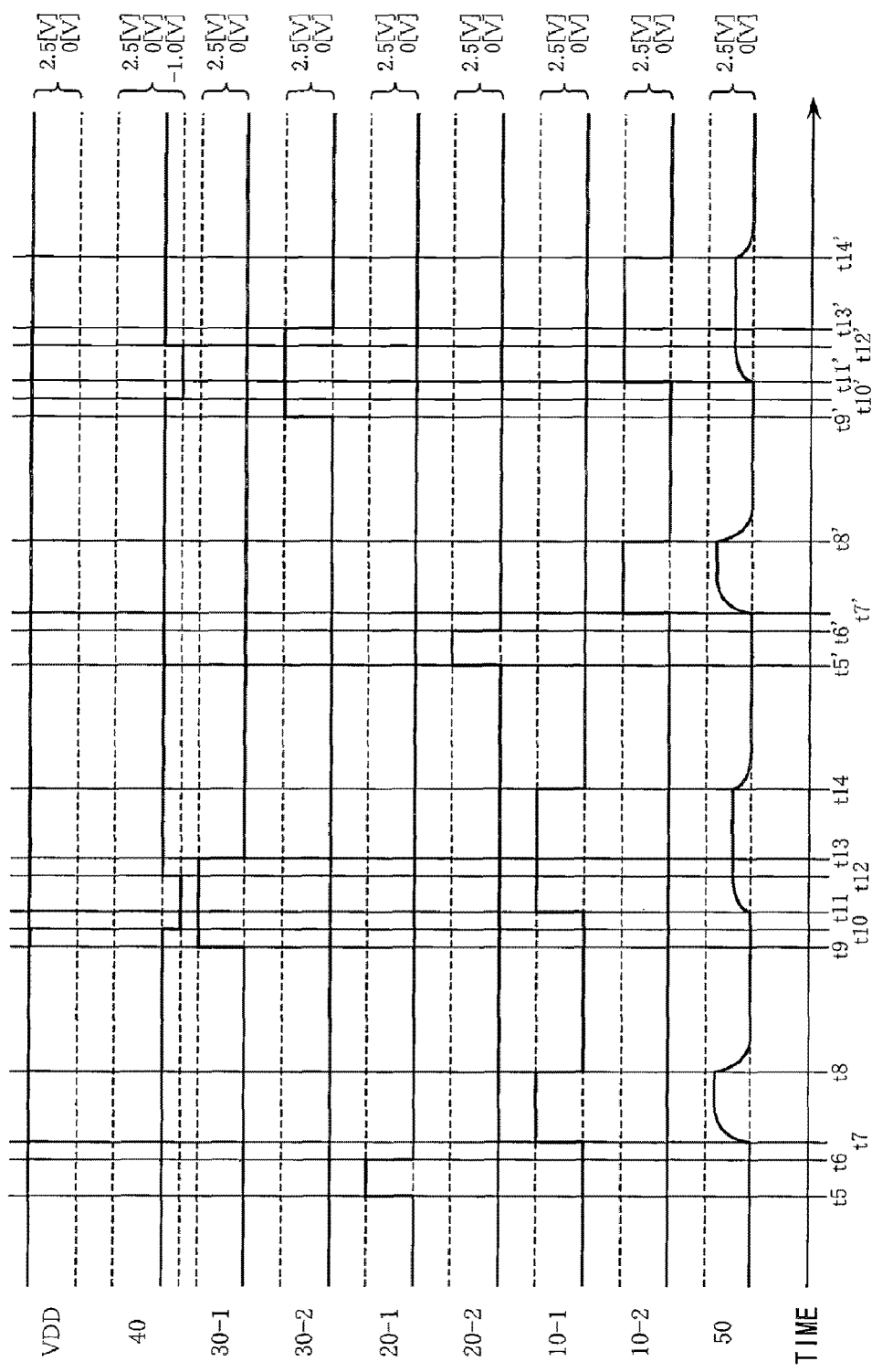
FIG. 2 is a timing chart for explaining operation of the first embodiment shown in FIG. 1.

An operation of the first embodiment having such construction will now be described by way of a timing chart of FIG. 2. At first, the FD reset switch line 20-1 of the first pixel 1-1 is driven to High level (time: t5 to t6) to reset the charge accumulation section FD-1 to a power supply voltage VDD. Next, the select switch line 10-1 is driven to High level (time: t7 to t8) to output a reset level of the first pixel 1-1 from the vertical signal line 50. Next, the transfer switch line 30-1 is driven to High level (time: t9 to t13), and the signal transfer assisting switch line 40 is brought to Minus level (time: t10 to t12).

The signal charge from photodiode PD-1 of the first pixel 1-1 is thereby transferred to the charge accumulation section FD-1. By driving the select switch line 10-1 to High level again (time: t11 to t14), a signal level of the first pixel 1-1 is outputted from the vertical signal line 50. It becomes possible to obtain a signal component by subsequently differentiating the two levels (reset level and signal level) at a signal processing circuit section (not shown). A signal component from the second pixel 1-2 can also be obtained in a similar manner (time: t5' to t14'). Here, "High level" is assumed to be the power supply voltage (2.5V in this case), and "Minus level" be a negative voltage (−1.0V in this case) which is lower than ground voltage GND (0V).

Figure 3:
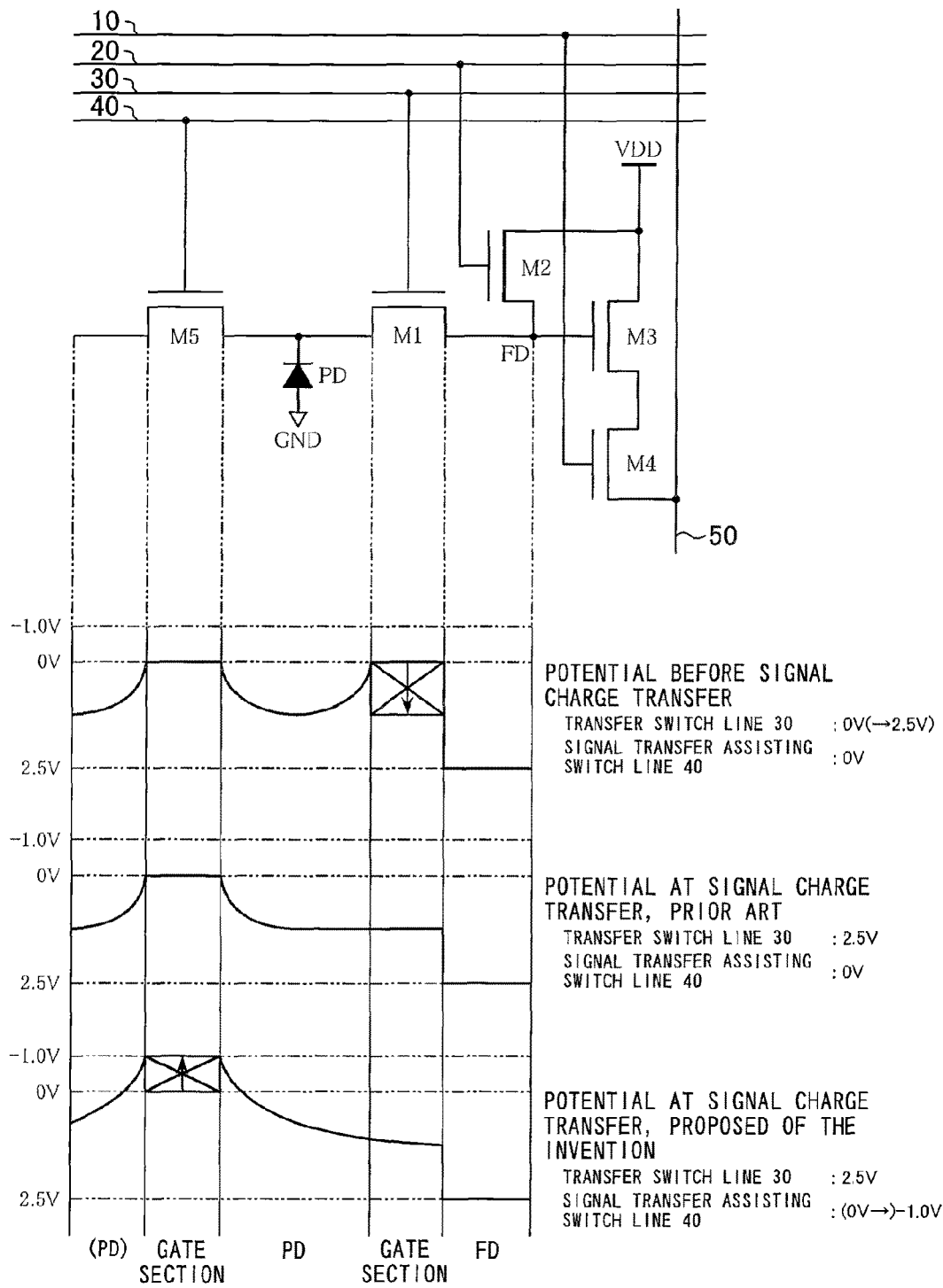
FIG. 3 shows modes of potential of each section at the time of signal electric charge transfer at the pixel of the first embodiment shown in FIG. 1.

A description will be given below by way of a pixel potential diagram of FIG. 3 with respect to potential condition of each section at the time of signal charge transfer from photodiode PD to the charge accumulation section FD in pixel of the present embodiment. At the time of signal charge transfer in the present embodiment, the transfer switch line 30 is driven to High level, and at the same time the signal transfer assisting switch line 40 is brought to Minus level. It thereby becomes possible to use a modulation effect of the signal transfer assisting MOS transistor M5 so as to make more suitable the gradient of potential in the vicinity of photodiode PD. It should be noted that potential condition in a prior-art pixel without having signal transfer assisting MOS transistor M5 is shown in FIG. 3 for the purpose of comparison (a mode of the prior-art example being shown in FIG. 3 with supposing applied voltage to the signal transfer assisting switch line 40 as 0V).

As has been described, at the time of signal charge transfer from photodiode PD (PD-1, PD-2) to the charge accumulation section FD (FD-1, FD-2), the transfer switch line 30 is driven to High level and the signal transfer assisting switch line 40 is brought to Minus level. It thereby becomes possible to use the modulation effect of the signal transfer assisting MOS transistor M5 so as to make easier transfer of signal charge from photodiode PD to the charge accumulation section FD.

Embodiment 2

Figure 4:
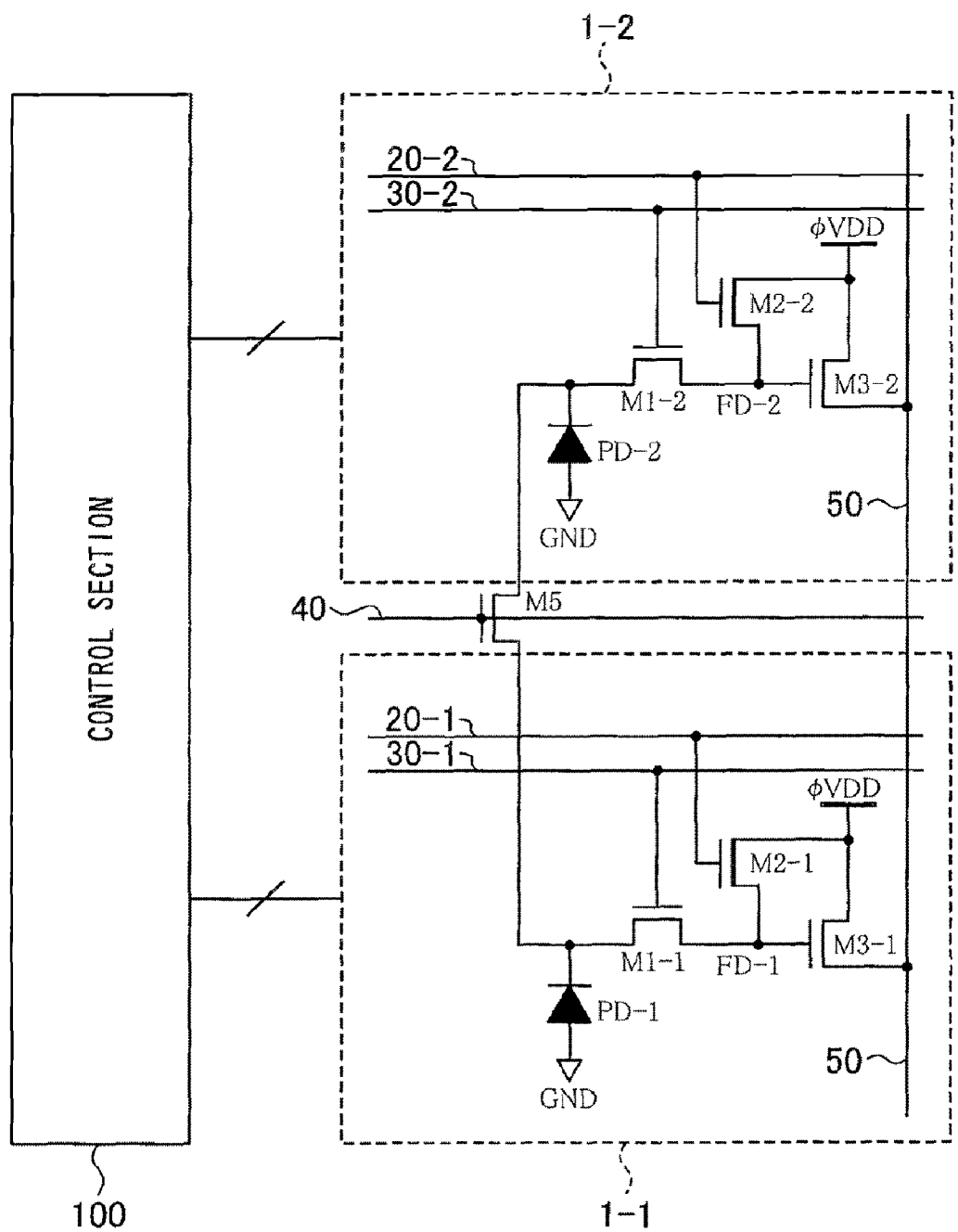
FIG. 4 shows an equivalent circuit construction of pixel of a pixel section and its control section in a second embodiment.

A second embodiment of the invention will now be described. The second embodiment also corresponds to an embodiment according to the first to third aspects of the invention. FIG. 4 shows an equivalent circuit of pixel of a pixel section and its control section in the solid-state imaging apparatus according to the second embodiment. While also in FIG. 4, only a first pixel 1-1 and a second pixel 1-2 are shown as the pixels, the pixel section is constructed such that pixels of the same construction as the first or second pixel are arranged into a two-dimensional matrix. As shown in FIG. 4, the first pixel 1-1 and second pixel 1-2 respectively include: a photodiode PD-1, PD-2 for generating signal electric charges corresponding to the amount of incident electromagnetic wave; an electric charge accumulation section FD-1, FD-2 for accumulating electric charges generated at the photodiode PD-1, PD-2; a transfer MOS transistor M1-1, M1-2 which is a transfer switch for transferring the generated electric charges to the charge accumulation section FD-1, FD-2; a reset transistor M2-1, M2-2 which is a reset switch for resetting the charge accumulation section FD-1, FD-2; an amplification transistor M3-1, M3-2 for amplifying signal that corresponds to the electric charges of the charge accumulation section FD-1, FD-2; FD reset switch line 20-1, 20-2; transfer switch line 30-1, 30-2; and a vertical signal line 50. The reset transistor M2-1, M2-2 is assumed to be a depletion type MOS transistor (or an equivalent transistor).

A signal transfer assisting MOS transistor M5 is connected between photodiode PD-1 of the first pixel 1-1 and photodiode PD-2 of the second pixel 1-2, and the gate of the MOS transistor M5 is connected to a signal transfer assisting switch line 40. It should be noted that FD reset switch line 20-1, 20-2, transfer switch line 30-1, 30-2, and signal transfer assisting switch line 40 are respectively connected in common to those pixels that are arranged in a row direction, and the vertical signal line 50 is connected in common to those pixels that are arranged in a column direction. Each section is driven and controlled by control signal from a control section 100. The construction of this embodiment is different from the first embodiment in that a power supply line (VDD) is made as clock operation (φVDD) so as to cause it to operate as a select means, instead of providing select transistor M4-1, M4-2 serving as select switch and select switch line 10-1, 10-2.

Figure 5:
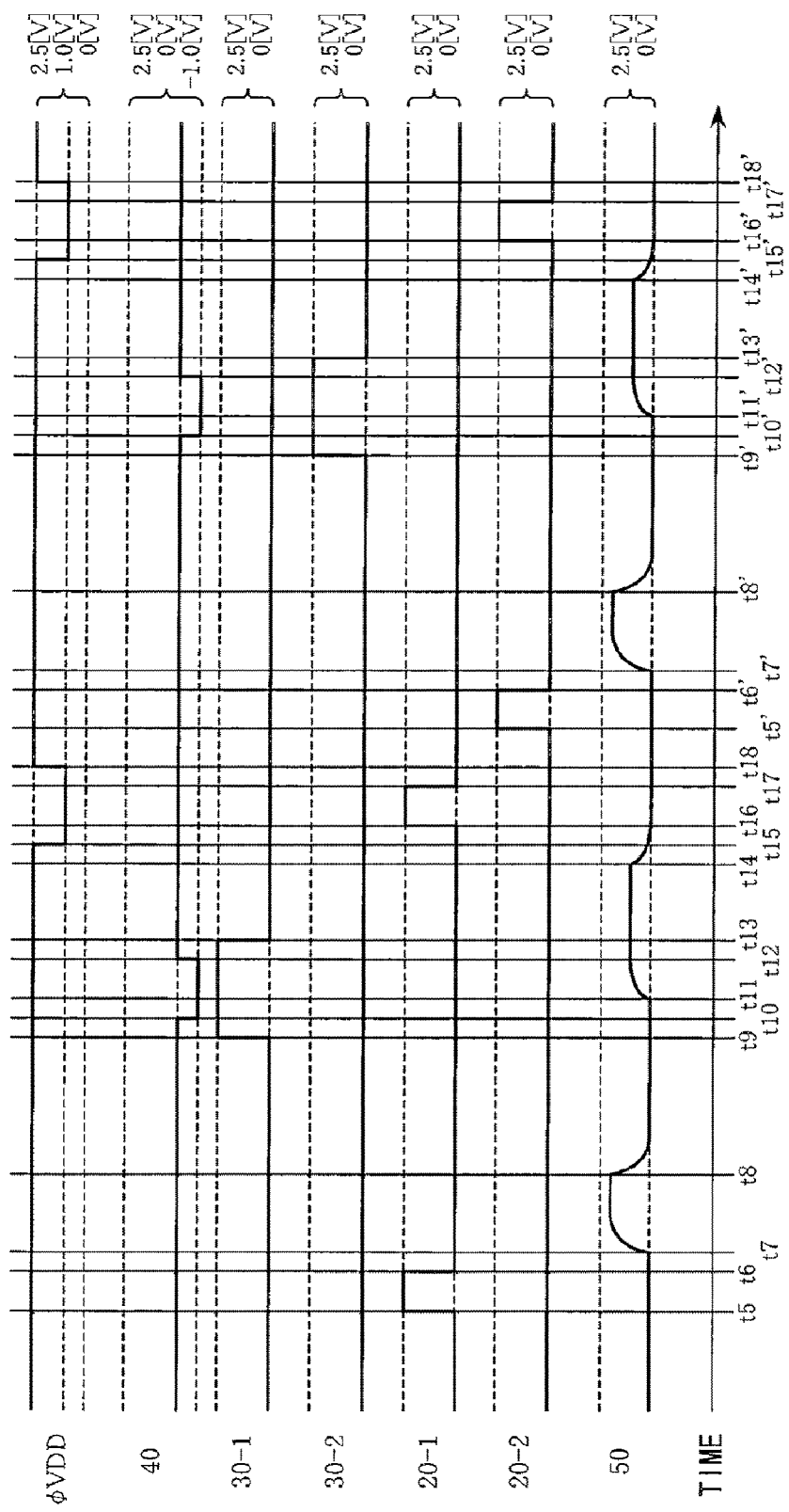
FIG. 5 is a timing chart for explaining operation of the second embodiment shown in FIG. 4.

An operation of the second embodiment will now be described by way of a timing chart of FIG. 5. The operation in the period of time t5 to t14, and t5' to t14' is similar to the first embodiment. The power supply line (φVDD) is brought to Low level (for example to 1.0V) in the interim of time t15 to t18 and t15' to t18', and FD reset switch line 20-1, 20-2 is driven to High level (time: t16 to t17, t16' to t17'). By thus bringing the charge accumulation section FD-1, FD-2 to Low level, the first pixel or second pixel is brought to its non-selected state. The rest of the operation is similar to the first embodiment and will not be described.

According to the second embodiment as has been described, the number of transistors of pixel is substantially unchanged even when the signal transfer assisting MOS transistor M5 is provided. It is thereby possible, while restricting an increase in pixel pitch, to use modulation effect of the signal transfer assisting MOS transistor M5 similarly to the first embodiment so as to make easier transfer of signal charges from photodiode PD (PD-1, PD-2) to the charge accumulation section FD (FD-1, FD-2).

Embodiment 3

Figure 6:
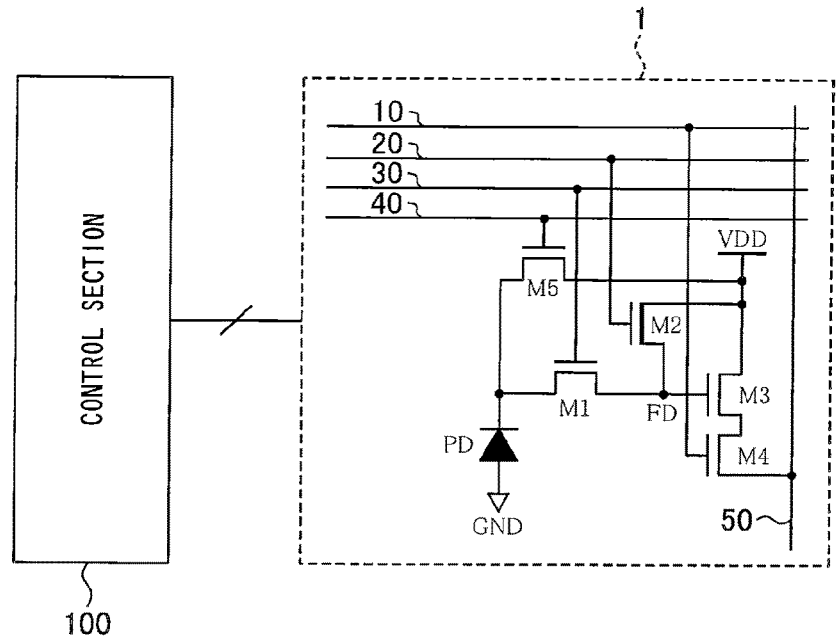
FIG. 6 is an equivalent circuit construction of pixel of a pixel section and its control section in a third embodiment.

A third embodiment will now be described. The third embodiment corresponds to an embodiment according to the first to fifth aspects of the invention. FIG. 6 shows an equivalent circuit of pixel of a pixel section and its control section in the solid-state imaging apparatus according to the third embodiment. While only a single pixel is shown in FIG. 6, the pixel section is constructed by arranging pixels of the same construction into a two-dimensional matrix. As shown in FIG. 6, the pixel 1 includes: a photodiode PD for generating signal electric charges corresponding to the amount of incident electromagnetic wave; a charge accumulation section FD for accumulating electric charges generated at the photodiode PD; a transfer MOS transistor M1 serving as transfer switch for transferring the generated electric charges to the charge accumulation section FD; a reset transistor M2 serving as reset switch for resetting the charge accumulation section FD; an amplification MOS transistor M3 for amplifying signal that corresponds to the electric charges of the charge accumulation section FD; a select transistor M4 serving as select switch for selecting the amplified signal; a signal transfer assisting MOS transistor M5 serving as signal transfer assisting switch; select switch line 10; FD reset switch line 20; transfer switch line 30; signal transfer assisting switch line 40; and vertical signal line 50. The reset transistor M2 is assumed to be a depletion type MOS transistor (or an equivalent transistor).

It should be noted that the select switch line 10, FD reset switch line 20, transfer switch line 30, and signal transfer assisting switch line 40 are respectively connected in common to those pixels that are arranged in a row direction, and the vertical signal line 50 is connected in common to those pixels that are arranged in a column direction. Each section is driven and controlled by control signal from a control section 100.

Figure 7:
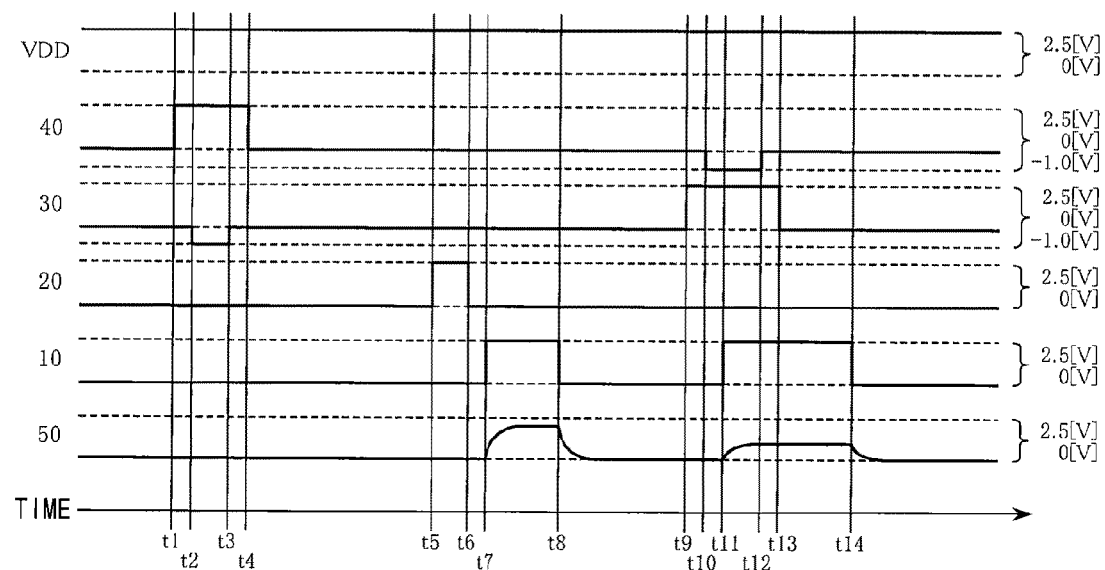
FIG. 7 is a timing chart for explaining operation of the third embodiment shown in FIG. 6.

An operation of the third embodiment will now be described by way of a timing chart of FIG. 7. At first, the signal transfer assisting switch line 40 is driven to High level (time: t1 to t4) and the transfer switch line 30 is brought to Minus level (time: t2 to t3) to discharge the electric charges of the photodiode PD to power supply line (VDD). Next, FD reset switch line 20 is driven to High level (time: t5 to t6) to reset the charge accumulation section FD, and the select switch line 10 is driven to High level (time: t7 to t8). A reset level of pixel is thereby outputted from the vertical signal line 50.

Next, the transfer switch line 30 is driven to High level (time: t9 to t13), and the signal transfer assisting switch line 40 is brought to Minus level (time: t10 to t12). The signal charges of photodiode PD is thereby completely transferred to the charge accumulation section FD, and a signal level of the pixel is outputted from the vertical signal line 50 by driving the select switch line 10 to High level (time: t11 to t14). It becomes possible to obtain a signal component by subsequently differentiating the two levels at a signal processing circuit section (not shown).

Here, "High level" is assumed to be the power supply voltage (2.5V in this case), and "Minus level" be a negative voltage (−1.0V in this case) which is lower than ground voltage GND (0V).

Figure 8:
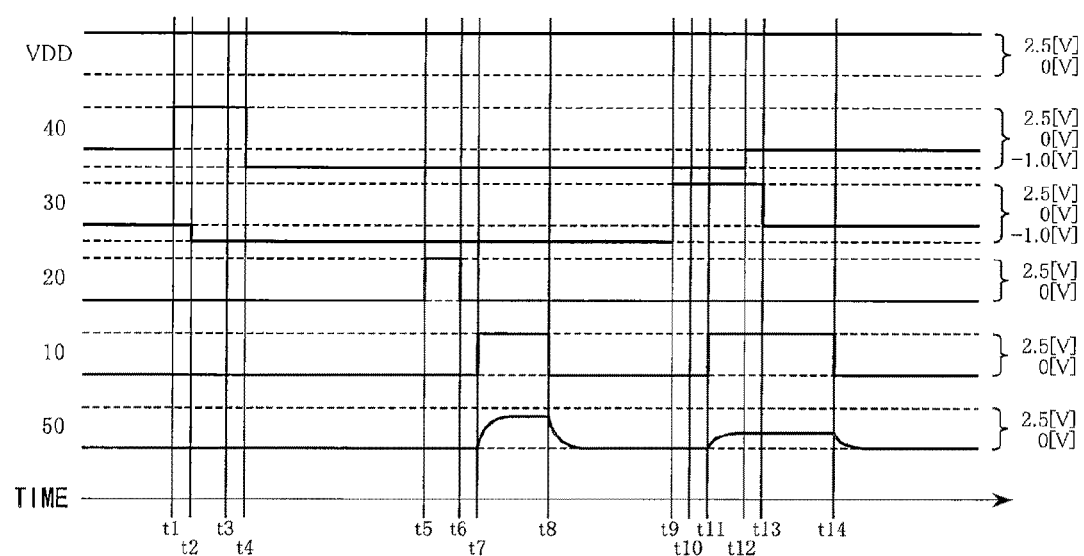
FIG. 8 is a timing chart for explaining a more preferred operation of the third embodiment shown in FIG. 6.

Further, a more preferred drive is attained by causing an operation as shown in a timing chart of FIG. 8. In the operation shown in FIG. 7, the signal transfer assisting switch line 40 is driven to High level (time: t1 to t4), and also the transfer switch line 30 is brought to Minus level (time: t2 to t3). Subsequently, the transfer switch line 30 is driven to High level (time: t9 to t13), and also the signal transfer assisting switch line 40 is brought to Minus level (time: t10 to t12). With the operation shown in FIG. 8 in this period, the signal transfer assisting switch line 40 is brought to Minus level (time: t4 to t12), and also the transfer switch line 30 is brought to Minus level (time: t2 to t9). It is thereby possible to suppress a dark current occurring at pixel, especially at photodiode PD.

Figure 9:
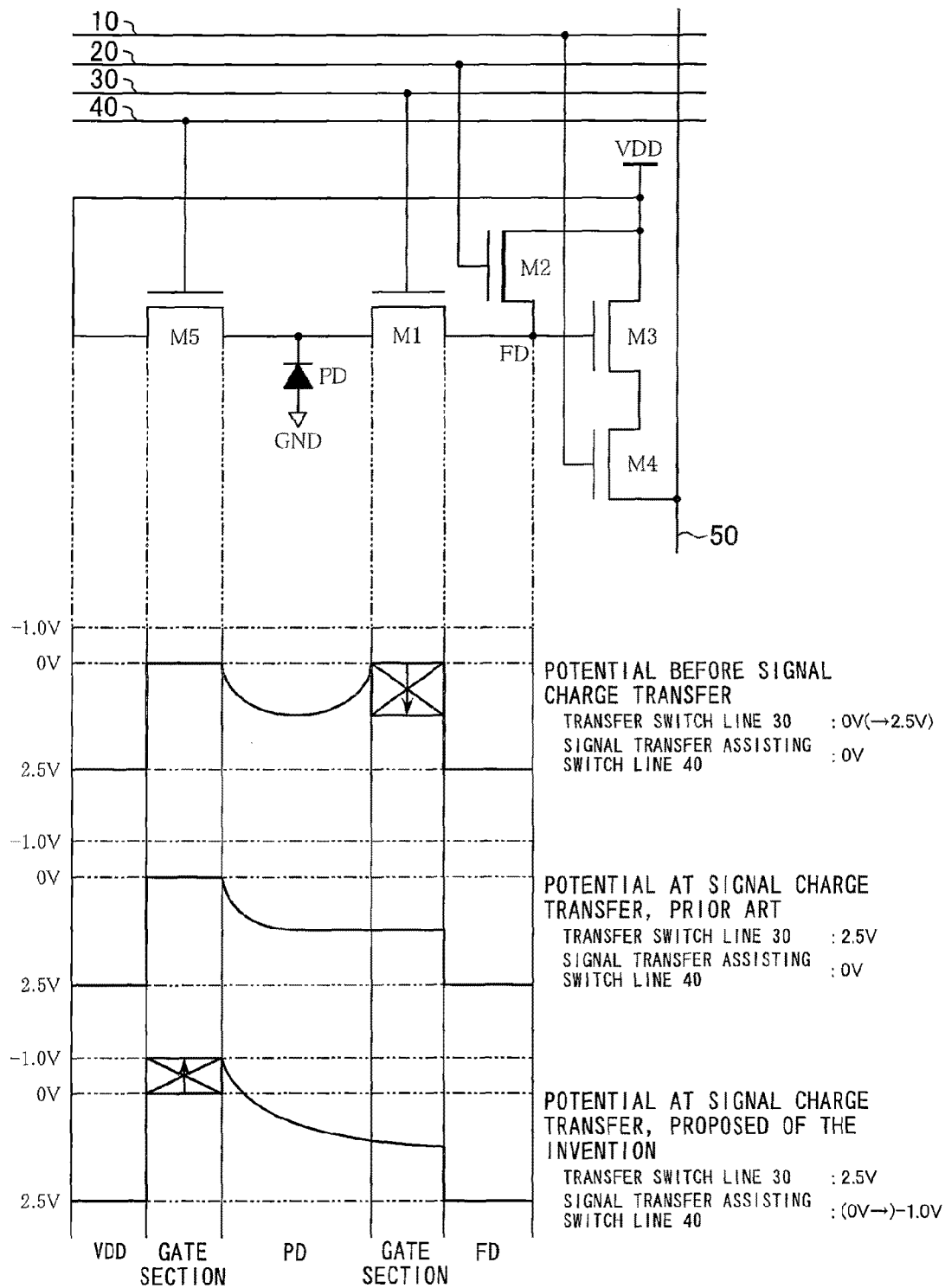
FIG. 9 shows modes of potential of each section at the time of signal electric charge transfer at the pixel of the third embodiment shown in FIG. 6.
Figure 10:
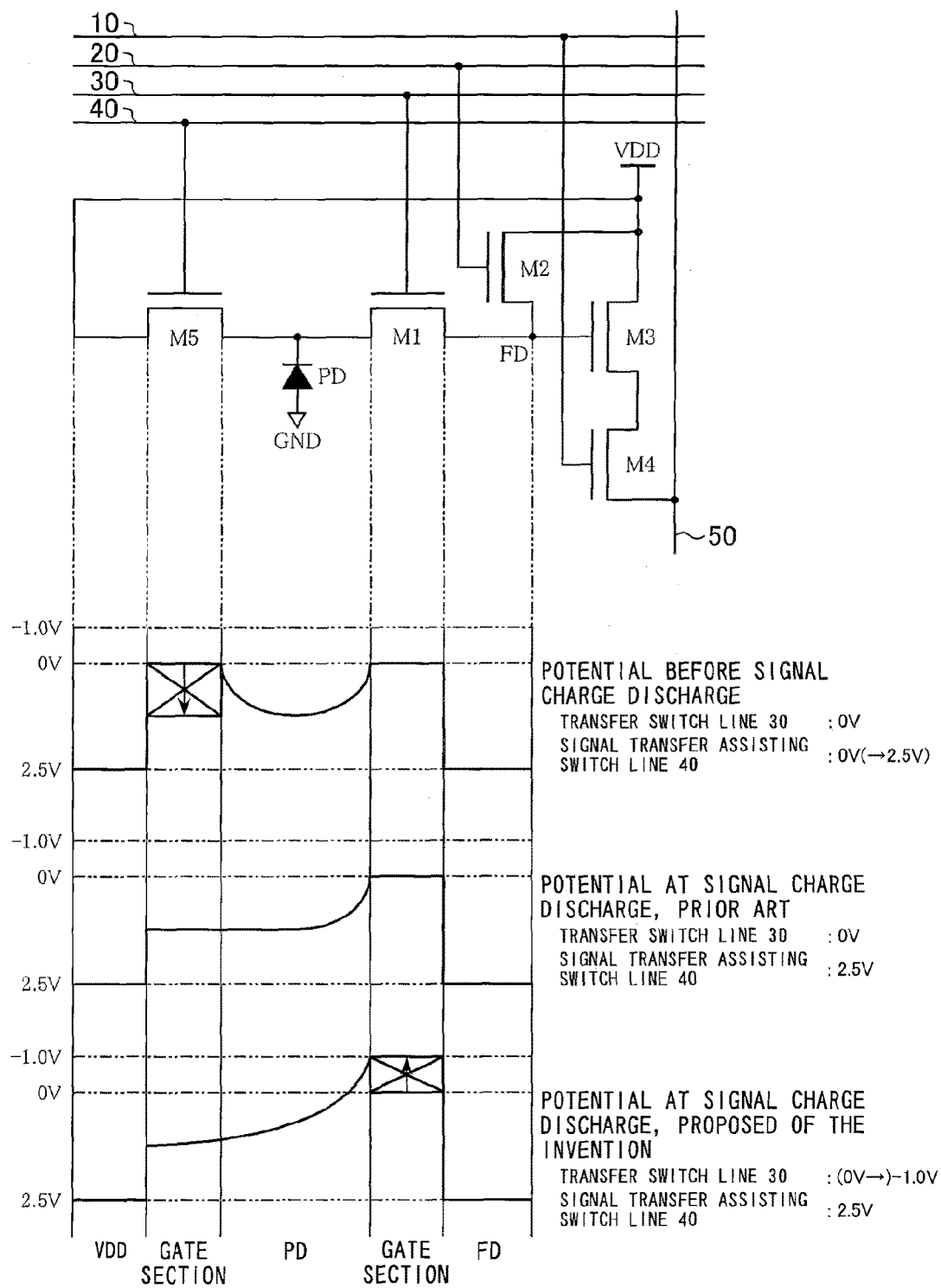
FIG. 10 shows modes of potential of each section at the time of discharge of signal electric charge at the pixel of the third embodiment shown in FIG. 6.

A description will now be given with respect to potential condition of each section of pixel at the time of signal charge transfer and at the time of signal charge discharge in the present embodiment. The potential condition of each section at the time of signal charge transfer is shown in FIG. 9. At the time of signal charge transfer from photodiode PD to the charge accumulation section FD, the transfer switch line 30 is driven to H level, and also the signal transfer assisting switch line 40 is brought to Minus level. It thereby becomes possible to use modulation effect of the signal transfer assisting MOS transistor M5 so as to make more suitable the gradient of potential in the vicinity of photodiode PD. Further, the potential condition of each section at the time of signal charge discharge is shown in FIG. 10. At the time of signal charge discharge from photodiode PD to the power supply line (VDD), the transfer switch line 30 is brought to Minus level, and also the signal transfer assisting switch line 40 is driven to High level. It is thereby possible to make more suitable the potential gradient in the vicinity of photodiode PD by using modulation effect of the transfer MOS transistor M1. It should be noted that also in FIGS. 9 and 10, the potential conditions at the time of prior-art signal charge transfer and signal charge discharge are shown for the purpose of comparison.

As has been described, when signal charges from photodiode PD are transferred to the charge accumulation section FD, the transfer switch line 30 is driven to High level and also the signal transfer assisting switch line 40 to Minus level. The modulation effect of the signal transfer assisting MOS transistor M5 is thereby used. Further, when signal charges from photodiode PD are discharged to the power supply line (VDD), the transfer switch line 30 is brought to Minus level and also the signal transfer assisting switch line 40 to High level. The modulation effect of the transfer MOS transistor M1 is thereby used. In this manner, it is possible to facilitate the transfer or discharge operation.

Embodiment 4

Figure 11:
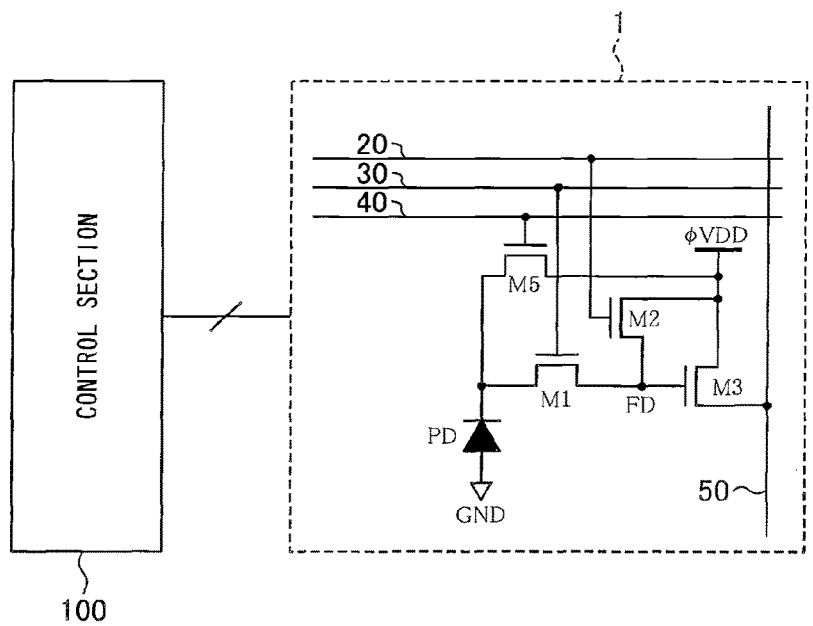
FIG. 11 shows an equivalent circuit construction of pixel of a pixel section and its control section in a fourth embodiment.

A fourth embodiment will now be described. The fourth embodiment also corresponds to an embodiment according to the first to fifth aspects of the invention. FIG. 11 shows an equivalent circuit of pixel of a pixel section and its control section in the solid-state imaging apparatus according to the fourth embodiment. While only a single pixel is shown in FIG. 11, the pixel section is constructed by arranging pixels of the same construction into a two-dimensional matrix. As shown in FIG. 11, the pixel 1 includes: a photodiode PD for generating signal electric charges corresponding to the amount of incident electromagnetic wave; a charge accumulation section FD for accumulating electric charges generated at the photodiode PD; a transfer MOS transistor M1 serving as transfer switch for transferring the generated electric charges to the charge accumulation section FD; a reset transistor M2 serving as reset switch for resetting the charge accumulation section FD; an amplification MOS transistor M3 for amplifying signal that corresponds to the electric charges of the charge accumulation section FD; a signal transfer assisting MOS transistor M5 serving as signal transfer assisting switch; FD reset switch line 20; transfer switch line 30; signal transfer assisting switch line 40; and vertical signal line 50. The reset transistor M2 is assumed to be a depletion type MOS transistor (or an equivalent transistor).

It should be noted that the FD reset switch line 20, transfer switch line 30, and signal transfer assisting switch line 40 are respectively connected in common to those pixels that are arranged in a row direction, and the vertical signal line 50 is connected in common to those pixels that are arranged in a column direction. Each section is driven and controlled by control signal from a control section 100. The construction of this embodiment is different from the third embodiment shown in FIG. 6 in that a power supply line (VDD) is made as clock operation (φVDD) so as to cause it to operate as a select means, instead of providing select transistor M4 serving as select switch and select switch line 10.

Figure 12:
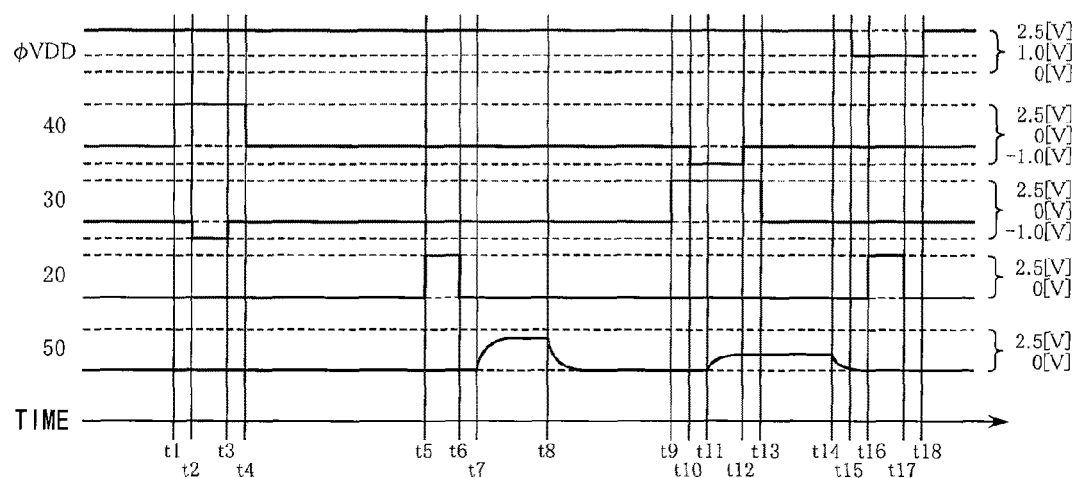
FIG. 12 is a timing chart for explaining operation of the fourth embodiment shown in FIG. 11.
Figure 13:
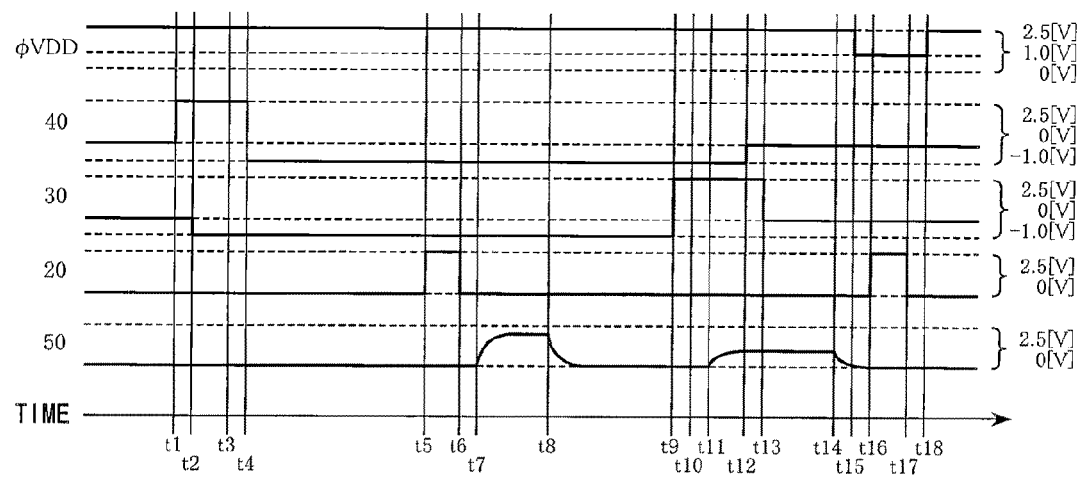
FIG. 13 is a timing chart for explaining a more preferred operation of the fourth embodiment shown in FIG. 11.

An operation of the fourth embodiment will now be described by way of timing charts of FIGS. 12 and 13. The operation in the period of time t1 to t14 is similar to the operation of the third embodiment shown in FIGS. 7 and 8. The power supply line (φVDD) is brought to Low level (for example to 1.0V) in the interim of time t15 to t18, and FD reset switch line 20 is driven to High level (time: t16 to t17). By thus bringing the charge accumulation section FD to Low level, the pixel is brought to its non-selected state. The rest of the operation is similar to the third embodiment shown in FIGS. 7 and 8 and will not be described.

According to the fourth embodiment as has been described, the number of transistors of pixel is substantially unchanged even when the signal transfer assisting MOS transistor M5 is provided. It is thereby possible, while restricting an increase in pixel pitch, to make easier the transfer or discharge operation from photodiode PD similarly to the third embodiment.

Embodiment 5

Figure 14:
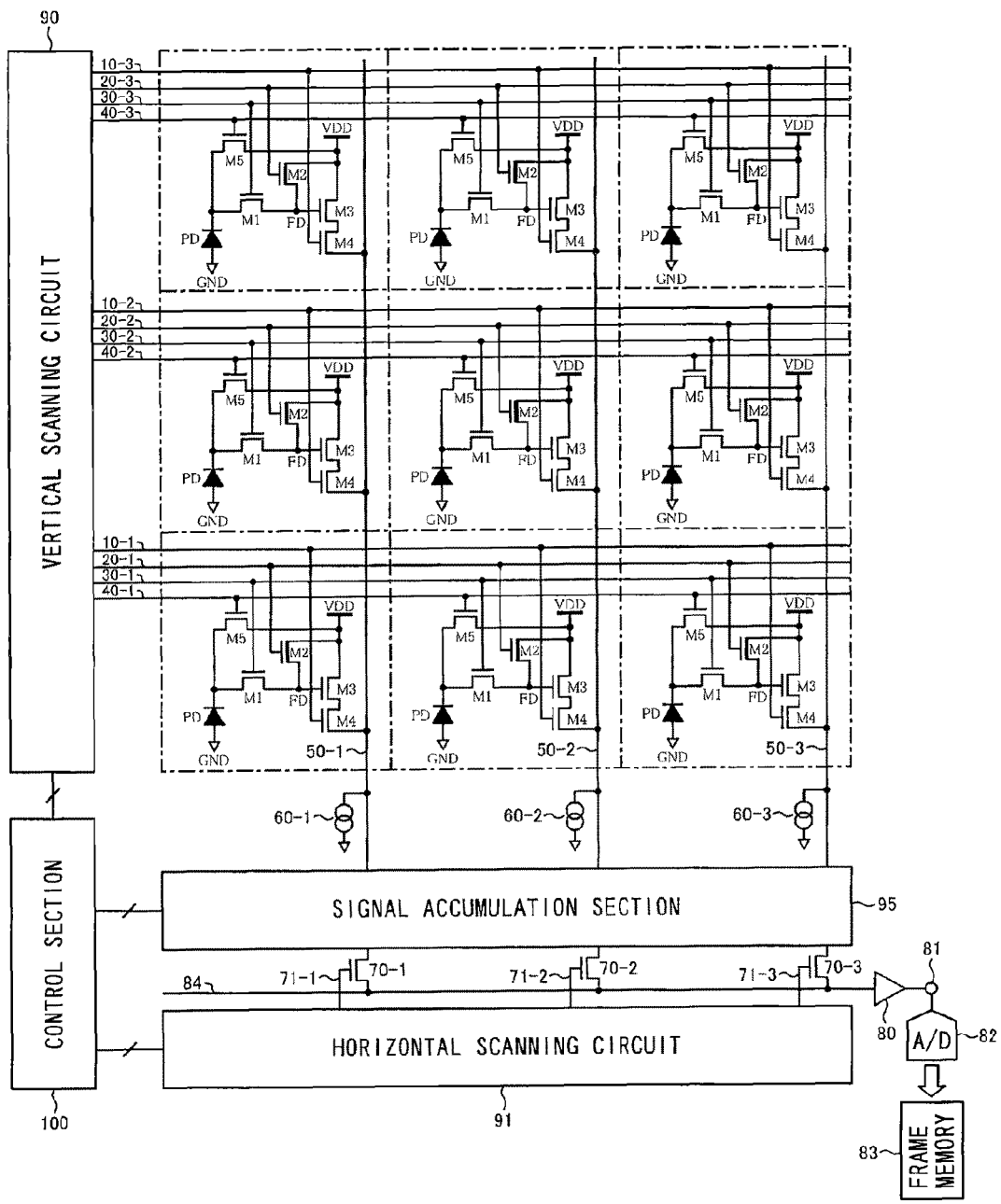
FIG. 14 is a circuit diagram showing construction of the solid-state imaging apparatus according to a fifth embodiment.

A fifth embodiment will now be described. The fifth embodiment also corresponds to an embodiment according to the first to fifth aspects of the invention. FIG. 14 is a circuit diagram showing construction of the solid-state imaging apparatus according to the fifth embodiment. The solid-state imaging apparatus according to this embodiment includes: a pixel section where pixel cells of the pixel construction according to the third embodiment shown in FIG. 6 are, for ease of explanation, arranged into 3 rows by 3 columns; select switch lines 10-1, 10-2, 10-3; FD reset switch lines 20-1, 20-2, 20-3; transfer switch lines 30-1, 30-2, 30-3; signal transfer assisting switch lines 40-1, 40-2, 40-3; vertical signal lines 50-1, 50-2, 50-3; constant current supplies 60-1, 60-2, 60-3; common signal output transfer transistors 70-1, 70-2, 70-3 serving as common signal output transfer switch; common signal output transfer switch lines 71-1, 71-2, 71-3; an output amplifier 80; AD converter 82; a frame memory 83; a common signal output line 84; a vertical scanning circuit 90; a horizontal scanning circuit 91; a signal accumulation section 95; and a drive control section 100 for controlling these. It should be noted that subordinate numbers of the reference numerals in FIG. 14 are given correspondingly to each row or each column of the 3-row by 3-column pixel cells.

Figure 15:
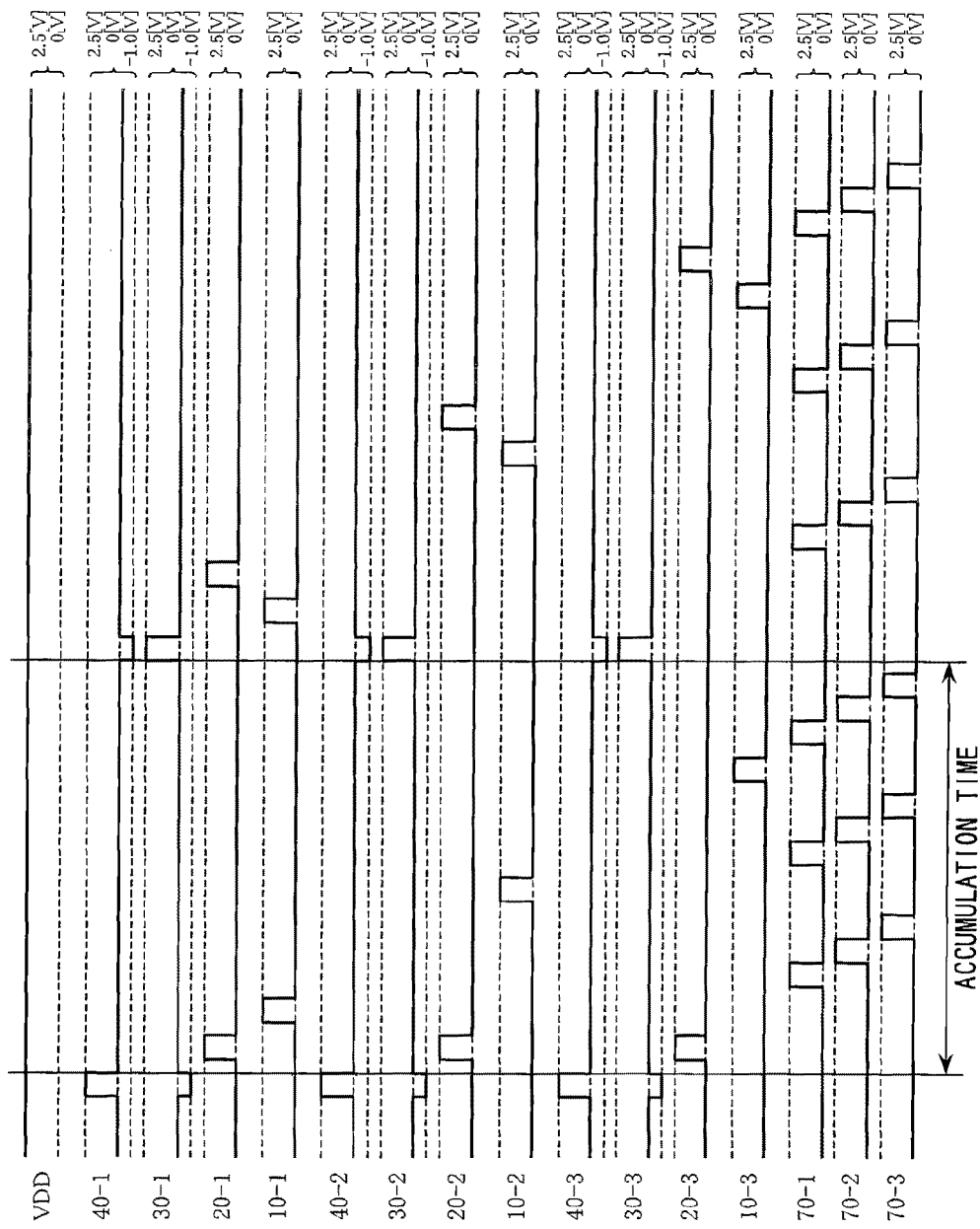
FIG. 15 is a timing chart for explaining operation of the fifth embodiment shown in FIG. 14.

An operation of the solid-state imaging apparatus according to the fifth embodiment having such construction will now be described by way of a timing chart of FIG. 15. At first, the signal transfer assisting switch lines 40-1 to 40-3 are driven to High level and at the same time the transfer switch lines 30-1 to 30-3 are brought to Minus level. The electric charges of photodiode PD of all pixels are thereby discharged to the power supply line (VDD). Next, the FD reset switch lines 20-1 to 20-3 are driven to High level to reset the charge accumulation section FD of all pixels. It should be noted that the signal transfer assisting switch lines 40-1 to 40-3, transfer switch lines 30-1 to 30-3, FD reset switch lines 20-1 to 20-3, and select switch lines 10-1 to 10-3 are driven by the vertical scanning circuit 90 in accordance with control of the drive control section 100.

Next, the select switch line 10-1 of the first row is driven to High level to retain a reset level of pixel at the signal accumulation section 95. Subsequently, the common signal output transfer switch lines 71-1 to 71-3 connected to the common signal output transfer transistors 70-1 to 70-3 are sequentially driven to H level. The reset levels of pixel are thereby sequentially outputted from an output terminal 81 through the common signal output line 84 and amplifier 80. The output (reset level) is subjected to analog-to-digital conversion by AD converter 82 and is retained at the frame memory 83. The accumulation operation to the signal accumulation section 95 is controlled/driven by the drive control section 100, and the common signal output transfer switch lines 71-1 to 71-3 are driven by the horizontal scanning circuit 91 in accordance with control of the drive control section 100. The second row and after are also read out in a similar manner as shown in FIG. 15, and reset levels corresponding to all pixels are retained at the frame memory 83.

After passage of a desired accumulation time, the signal transfer assisting switch lines 40-1 to 40-3 are brought to Minus level, and at the same time the transfer switch lines 30-1 to 30-3 are driven to High level. The electric charges of photodiode PD of all pixels are thereby transferred to the charge accumulation section FD.

Next, the select switch line 10-1 of the first row is driven to High level to retain a signal level of pixel at the signal accumulation section 95. Next, FD reset switch line 20-1 is driven to High level to reset the charge accumulation section FD. Subsequently, the common signal output transfer switch lines 71-1 to 71-3 connected to the common signal output transfer transistors 70-1 to 70-3 are sequentially driven to High level to sequentially output signal levels of pixel through the common signal output line 84 and amplifier 80. The output (signal level) is subjected to analog-to-digital conversion by AD converter 82, and its difference from the reset level of the first row previously retained at the frame memory 83 is taken. Only a signal component removed of a reset noise and a fixed-pattern noise is thereby extracted. The second row and after are similarly read out as shown in FIG. 15 so that signal components having high S/N are obtained.

As has been described, when signal charges from photodiode PD are transferred to the charge accumulation section FD, the transfer switch lines 30-1 to 30-3 are driven to High level and at the same time the signal transfer assisting switch lines 40-1 to 40-3 to Minus level. Thereby the modulation effect of the signal transfer assisting MOS transistor M5 is used. When signal charges from photodiode PD are discharged to the power supply line (VDD), the transfer switch lines 30-1 to 30-3 are brought to Minus level and at the same time the signal transfer assisting switch lines 40-1 to 40-3 to High level. Thereby the modulation effect of the transfer MOS transistor M1 is used. In this manner, it is possible to facilitate the respective operation of transfer and discharge. It should be noted that the present embodiment has been described with respect to but is not limited to the case where the timings of start and end of signal accumulation are the same for all rows with simply using pixel cells of 3-rows by 3-columns as pixels.

Embodiment 6

Figure 16:
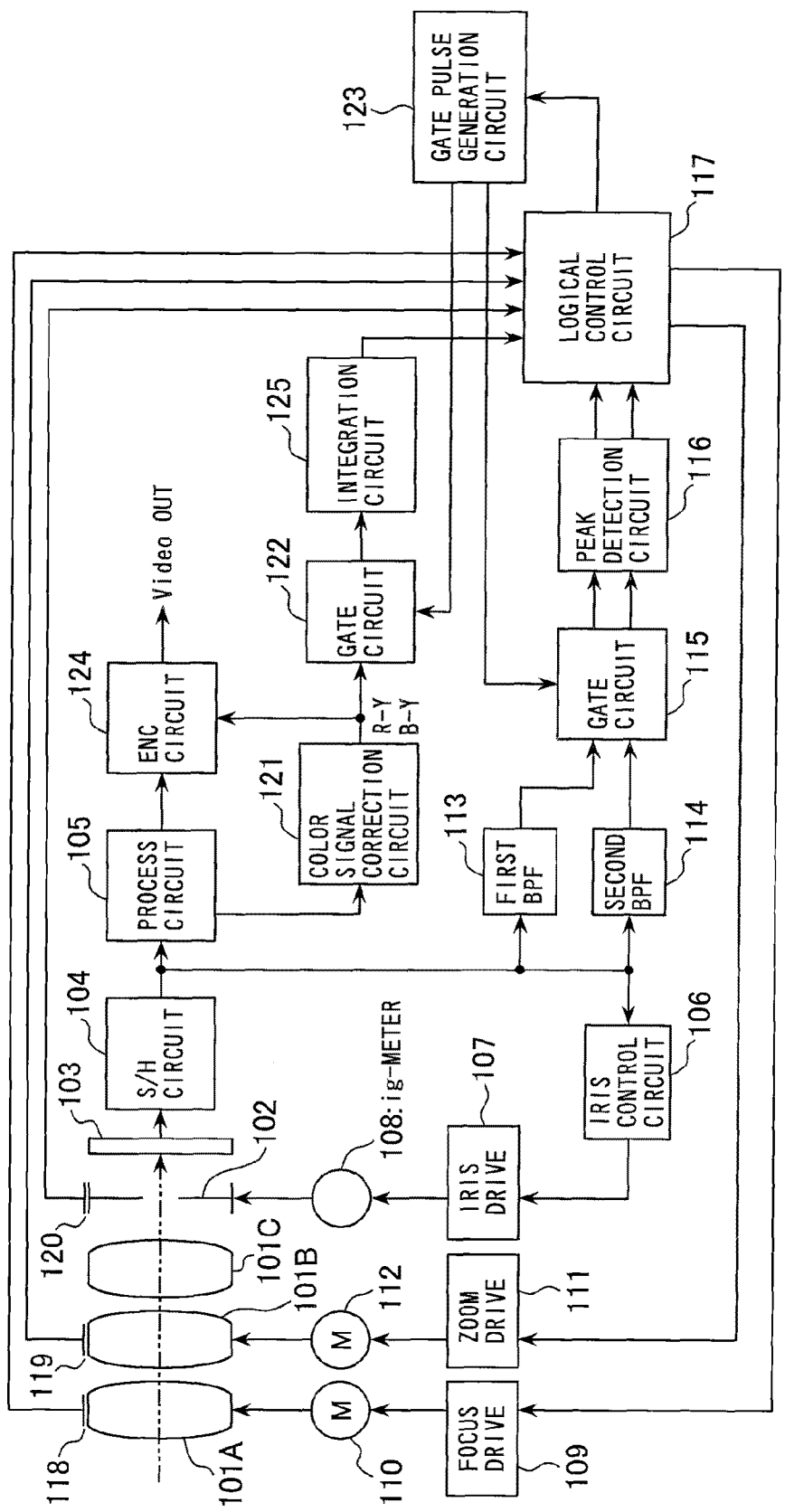
FIG. 16 is a block diagram showing an example of construction of video camera using the solid-state imaging apparatus according to the invention.

An example of construction where the solid-state imaging apparatus according to the invention is used in video camera will now be described as a sixth embodiment. FIG. 16 is a block diagram showing construction of the video camera. Referring to FIG. 16, what is denoted by 101A is a focus lens for effecting focus adjustment of taking lens; 101B is a zoom lens for effecting zoom operation; and 101C is a lens for forming image. Further, 102 is a stop, and 103 is a solid-state imaging apparatus for effecting photoelectric conversion of object image formed on an imaging plane so as to convert it into an electrical imaging signal, for which the solid-state imaging apparatus described in the fifth embodiment shown in FIG. 14 for example is used. 104 is a sample-and-hold circuit (S/H circuit) which samples and holds imaging signal outputted from the solid-state imaging apparatus 103 and further amplifies its signal level to output a video signal.

105 is a process circuit which effects predetermined processing such as gamma correction, color separation, blanking process, etc. on the video signal outputted from the sample-and-hold circuit 104, and outputs a luminance signal Y and a chroma signal C. The chroma signal C outputted from the process circuit 105 is corrected of white balance and color balance at a color signal correction circuit 121 from which it is outputted as color difference signal R-Y, B-Y. Further, the luminance signal Y outputted from the process circuit 105 and the color difference signal R-Y, B-Y outputted from the color signal correction circuit 121 are modulated at an encoder circuit (ENC circuit) 124, and are outputted wherefrom as standard television signal. This television signal is supplied to a video recorder or a monitor EVF such as electronic viewfinder (not shown). Further, the color difference signal R-Y, B-Y outputted from the color signal correction circuit 121 is gated at a gate circuit 122, and further its integration value is detected at an integration circuit 125 and is inputted to a logical control circuit 117. This signal is mainly used for adjustment of white balance (not shown).

106 is an iris control circuit which controls an iris drive circuit 107 based on video signal supplied from the sample-and-hold circuit 104. An ig meter 108 is then automatically controlled so as to control an aperture amount of the stop 102 so that image signal attains a level at constant value of predetermined level. 113 and 114 are a first and second band-pass filters (BPF1, BPF2) for cutting off different bands, which extract high-frequency components necessary for effecting focus detection from the video signal outputted from the sample-and-hold circuit 104. The signals outputted from the first band-pass filter (BPF1) 113 and the second band-pass filter (BPF2) 114 each are gated at a gate circuit 115 and focus gate limit signal, and their peak value is then detected and held at a peak detection circuit 116 and is inputted to the logical control circuit 117. This signal is referred to as focus voltage, and the system is brought into focus by this focus voltage.

Further, 118 is a focus encoder for detecting a displaced position of focus lens 101A; 119 is a zoom encoder for detecting a focal distance of zoom lens 101B; and 120 is an iris encoder for detecting the aperture amount of the stop 102. The detection values of these encoders are supplied to the logical control circuit 117 which performs system control. The logical control circuit 117 effects focus adjustment by performing focus detection on object based on video signal corresponding to the interior of a set focus detection region. In particular, it takes in a peak value information of high-frequency components supplied from the first and second band-pass filters 113, 114. It then supplies such control signals as the rotating direction, rotating rate, and rotation/halt of a focus motor 110 to a focus drive circuit 109 to control the focus motor 110 so that the focus lens 101A is driven to a position where the peak value of the high-frequency components becomes maximum.

Further, 123 is a gate pulse generation circuit which generates the gate limit signal of the gate circuits 115, 122 based on the control signal from the logical control circuit 117.

Since the solid-state imaging apparatus according to the invention and its drive method are used in the above video camera as has been described, the video camera having the video signal of high S/N is obtained.

Embodiment 7

Figure 17:
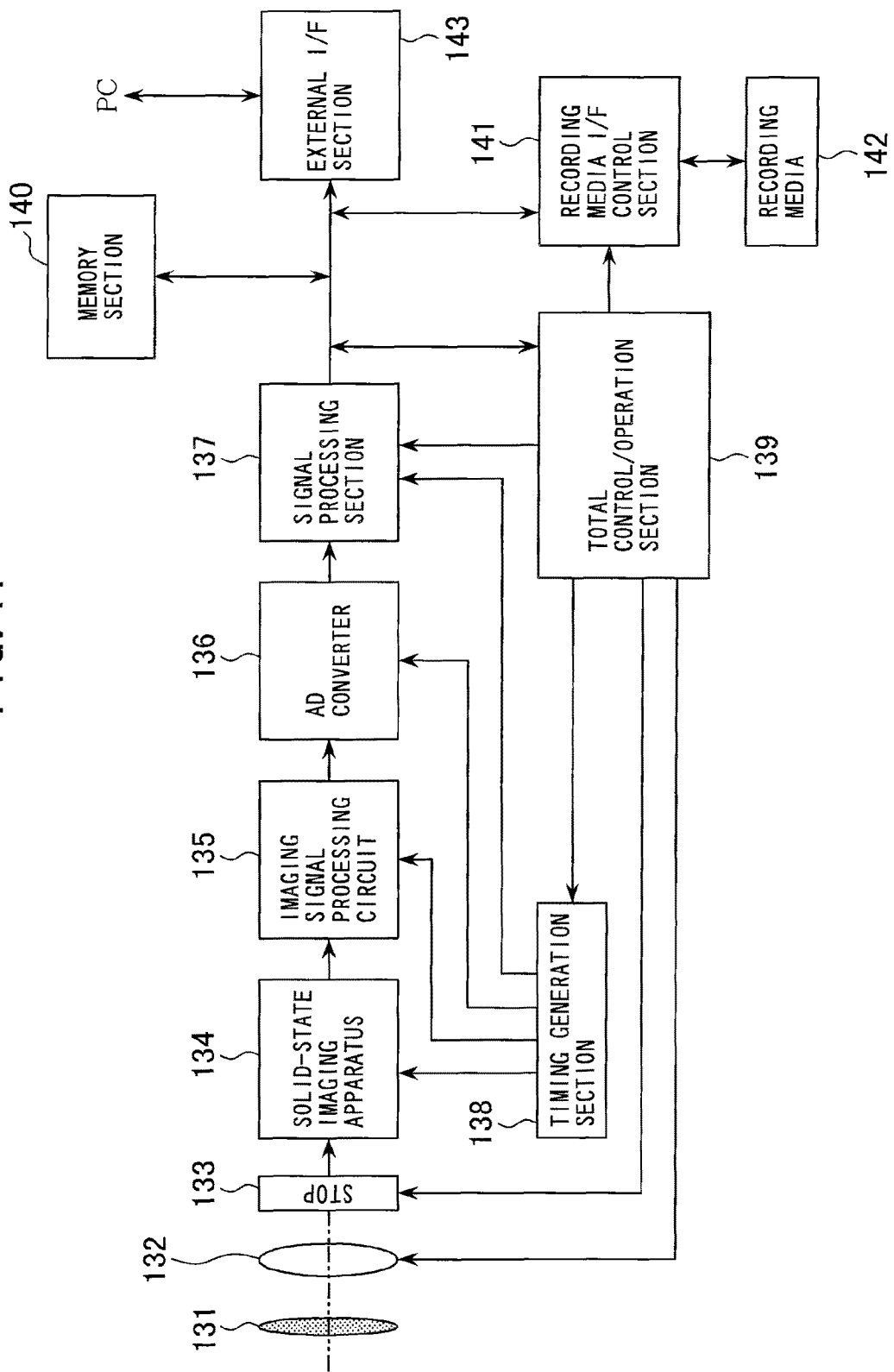
FIG. 17 is a block diagram showing an example of construction of digital still camera using the solid-state imaging apparatus according to the invention.

An example of construction where the solid-state imaging apparatus according to the invention is used for a digital still camera will now be described as a seventh embodiment. FIG. 17 is a block diagram showing construction of the digital still camera. FIG. 17 includes: 131, a barrier serving as both protection of lens and main switch; 132, a lens for forming an optical image of object on a solid-state imaging apparatus 134; 133, a stop for variably changing a light amount passing through the lens 132; and 134, the solid-state imaging apparatus for taking in as an image signal the object formed into image by the lens 132, for which the one described in the fifth embodiment shown in FIG. 14 for example is used. 135 is an image signal processing circuit for performing signal processing of the image signal outputted from the slid-state imaging apparatus 134; 136 is an A/D converter for performing analog-to-digital conversion of image signal outputted from the imaging signal processing circuit 135; 137 is a signal processing section for performing various correction of image data and compressing the data outputted from the A/D converter 136; and 138 is a timing generator section for outputting various timing signals to the solid-state imaging apparatus 134, imaging signal processing circuit 135, A/D converter 136, and signal processing section 137. Further, 139 is a total control/operation section for controlling various operations and the whole of the digital still camera; 140 is a memory section for temporarily storing image data; 141 is a recording medium control I/F (interface) section for effecting recording or reading to or from a recoding medium; 142 is an attachable/detachable recording medium such as semiconductor memory for recording or reading image data; and 143 is an external I/F (interface) section for communication for example with an external computer.

An operation at the time of taking image in thus constructed digital still camera will now be described. First a main power supply is turned ON and power supply of control system is then turned ON when the barrier 131 is opened, and further the power supply of imaging system circuits such as A/D converter 136 is turned ON. The total control/operation section 139 then releases the stop 133 to control an exposure amount. The signals outputted from the solid-state imaging apparatus 134 go through the imaging signal processing circuit 135, are A/D-converted at the A/D converter 136, and are then inputted to the signal processing section 137. A computation of exposure based on such data is effected at the total control/operation section 139. In other words, a brightness is judged by result of effecting photometry by the above processing so that the total control/operation section 139 controls the stop 133 in accordance with such result.

Next high-frequency components are extracted based on signals outputted from the solid-state imaging apparatus 134 to effect a computation of distance to the object at the total control/operation section 139. Subsequently, the lens 132 is driven to judge whether it is in focus or not. If judged as not in focus, the lens 132 is driven again to determine the distance. A main exposure is then started after confirming a focused condition. After the end of the exposure, image signals outputted from the solid-state imaging apparatus 134 and processed at the imaging signal processing circuit 135 are A/D-converted at A/D converter 136, then go through the signal processing section 137 and are written to the memory section 140 by the total control/operation section 139. Subsequently, data accumulated at the memory section 140 go through the recording medium control I/F section 141 and are recorded to the attachable/detachable recording medium 142 such as semiconductor memory by control of the total control/operation section 139. It is also possible to directly input the data for example to a computer through the external I/F section 143 so as to process the image.

Since the solid-state imaging apparatus according to the invention and its drive method are used in the above digital still camera as has been described, the digital still camera having the image signal of high S/N is obtained.

According to the invention, it is possible to provide a solid-state imaging apparatus with securing a saturation electron number and power supply voltage required for the product, and further to provide a video camera and digital still camera having an image signal of high S/N. The advantages of each aspect of the invention are as follows.

According to the first aspect, it is possible to make easier the signal charge transfer from a charge generation means to a charge accumulation means.

According to the second aspect, it is possible to readily form a signal transfer means and the above described signal transfer assisting means by means of a general (C) MOS process.

According to the third aspect, it is possible to form a more suitable potential gradient in the transferring of signal charges from the charge generation means by using a modulation effect of the second MOS transistor.

According to the fourth aspect, it becomes possible to discharge a fresh electric charges generated at the charge generation means so that the charge generation means can be brought into reset condition even when signal charges accumulated at the charge accumulation means is being read.

According to the fifth aspect, it is possible to form a more suitable potential gradient in the discharging of signal charges of the charge generation means by using a modulation effect of the first MOS transistor.

According to the sixth aspect, it is possible to provide a video camera having a image signal of high S/N.

According to the seventh aspect, it is possible to provide a digital still camera having a image signal of high S/N.

What is claimed is:

1. A solid-state imaging apparatus comprising:
an image section having a plurality of pixel units arranged into a matrix, each pixel unit having at least one subunit having an electric charge generation means for generating signal electric charges corresponding to the amount of incident electromagnetic wave and a signal transfer means for transferring signal electric charges generated by said electric charge generation means,
an electric charge accumulation means for accumulating said transferred signal electric charges, a first reset means for resetting said electric charge accumulation means, an amplification means for amplifying a signal corresponding to signal electric charges accumulated at said electric charge accumulation means, and a select means for selectively outputting said amplified signal to a vertical signal Line; and
a signal transfer assisting means for making a gradient of potential in the vicinity of said electric charge generation means toward said signal transfer means to be greater at the time of transfer of said signal electric charge than at the time of non-transfer, said signal transfer means contains a first MOS transistor, and said signal transfer assisting means contains a second MOS transistor,
wherein said first MOS transistor is activated at its control electrode at the time of transfer of said signal electric charge, and at the same time a potential of an opposite polarity from an activating potential is applied to said second MOS transistor at its control electrode.

2. The solid-state imaging apparatus according to claim 1, wherein said second MOS transistor is used as a second reset means for resetting said electric charge generation means.

3. The solid-state imaging apparatus according to claim 1, wherein said second MOS. transistor is used as a second reset means for resetting said electric charge generation means.

4. The solid-state imaging apparatus according to claim 2, wherein said second MOS transistor is activated at its control electrode at the time of a reset of signal electric charges of said electric charge generation means, and at the same time a potential of an opposite polarity from an activating polarity is applied to said first MOS transistor at its control electrode.

5. The solid-state Imaging apparatus according to claim 3, wherein said second MOS transistor is activated at its control electrode at the time of a reset of signal electric charges of said electric charge generation means, and at the same time a potential of an opposite polarity, from an activating polarity is applied to said first MOS transistor at its control electrode.

6. A video camera comprising:

the solid-state imaging apparatus according to any one of claim 1 or 2-5;

a lens for forming an object image on said solid-state imaging apparatus; and a signal processing means for effecting a predetermined signal processing on video signals from said solid-state imaging apparatus to generate a luminance signal and a chroma signal.

7. A digital still camera comprising:

the solid-state imaging apparatus according to any one of claim 1 or 2-5;

a lens for forming an object image on said solid-state imaging apparatus; and a signal processing means for processing signals from said solid-state imaging apparatus.

* * * * *